US012685251B2

(12) United States Patent

Welte et al.

(10) Patent No.: US 12,685,251 B2

(45) Date of Patent: Jul. 21, 2026

(54) BOOM HEIGHT SENSOR SYSTEMS, METHODS AND APPARATUS

(71) Applicant: 360 Yield Center, LLC, Morton, IL (US)

(72) Inventors: Jonathan T. Welte, Delavan, IL (US); Lucas J. Helton, Tremont, IL (US); Lee Dahlhauser, Heyworth, IL (US); Timothy Sauder, Morton, IL (US)

(73) Assignee: 360 Yield Center, LLC, Morton, IL (US)

( * ) Notice: Subject to any disclaimer, the term of this patent is extended or adjusted under 35 U.S.C. 154(b) by 30 days.

(21) Appl. No.: 18/601,956

(22) Filed: Mar. 11, 2024

(65) Prior Publication Data

US 2024/0206377 A1 Jun. 27, 2024

Related U.S. Application Data

(63) Continuation of application No. 16/547,545, filed on Aug. 21, 2019, now abandoned.

(Continued)

(51) Int. Cl.

| | |
|---|---|
| *A01C 23/04* | (2006.01) |
| *A01C 23/00* | (2006.01) |
| *A01M 7/00* | (2006.01) |
| *B05B 1/20* | (2006.01) |
| *B05B 12/12* | (2006.01) |

(52) U.S. Cl.
CPC .......... *A01C 23/047* (2013.01); *A01C 23/008* (2013.01); *A01C 23/04* (2013.01); *A01M*

*7/0057* (2013.01); *A01M 7/0078* (2013.01); *B05B 1/20* (2013.01); *B05B 12/124* (2013.01)

(58) Field of Classification Search
CPC .. A01M 7/0057; A01M 7/0078; B05B 13/005
See application file for complete search history.

(56) References Cited

U.S. PATENT DOCUMENTS

| 1,348,038 A | 7/1920 | Neumeyer |
|---|---|---|
| 2,301,213 A | 11/1942 | Kang |
| | (Continued) | |

FOREIGN PATENT DOCUMENTS

| WO | 8701909 A1 | 4/1987 |
|---|---|---|
| WO | 8801539 A1 | 3/1988 |

*Primary Examiner* — Cody J Lieuwen

(74) *Attorney, Agent, or Firm* — Thomas J. Oppold; Larkin Hoffman Daly & Lindgren, Ltd.

(57) ABSTRACT

A liquid applicator implement includes a boom vertically adjustable with respect to a vehicle. The boom supports a plurality of drop assemblies laterally spaced along the boom in communication with a liquid product source. A height sensor assembly is attached to at least one of the drop assemblies and generates height signals indicative of a distance between the drop assembly and a ground surface as the vehicle advances in a direction of travel. A controller is responsive to the generated height signals to actuate a boom height adjustment mechanism to adjust the height of the boom. In some embodiments, a breakaway sensor is used to determine whether at least one drop assembly has broken away from its normal substantially vertical operating orientation. In some embodiments, data processing and/or boom height control is determined upon detection of a breakaway event.

9 Claims, 14 Drawing Sheets

Related U.S. Application Data

(60) Provisional application No. 62/720,695, filed on Aug. 21, 2018.

(56) References Cited

U.S. PATENT DOCUMENTS

| | | | |
|---|---|---|---|
| 2,692,799 A | 10/1954 | Parrott | |
| 3,117,725 A | 1/1964 | Palmer | |
| 3,147,568 A | 9/1964 | Inhofer | |
| 3,235,187 A | 2/1966 | Merritt et al. | |
| 3,478,967 A | 11/1969 | Horton et al. | |
| 3,515,349 A | 6/1970 | Mecklin et al. | |
| 4,382,555 A | 5/1983 | Ucinhazska et al. | |
| 4,521,988 A | 6/1985 | Thacker | |
| 4,583,319 A | 4/1986 | Wolff et al. | |
| 4,736,888 A | 4/1988 | Fasnacht | |
| 4,842,195 A | 6/1989 | Koll | |
| 4,970,973 A | 11/1990 | Lyle | |
| 5,516,044 A | 5/1996 | Thorstensson | |
| 5,586,728 A | 12/1996 | McKenry | |
| 5,996,904 A | 12/1999 | Smeraldi | |
| 6,202,395 B1 * | 3/2001 | Gramm | A01D 41/141 |
| 6,343,749 B1 | 2/2002 | Thom | |
| 7,077,070 B1 | 7/2006 | Williams | |
| 8,027,751 B2 | 9/2011 | Dingle | |
| 8,701,909 B2 | 4/2014 | Endert | |
| 8,801,539 B2 | 8/2014 | Folck | |
| 8,864,048 B1 | 10/2014 | Light | |
| 10,441,965 B2 * | 10/2019 | Feldhaus | B05B 1/20 |
| 10,499,561 B2 * | 12/2019 | Grotelueschen | A01M 7/0057 |
| 2004/0158381 A1 | 8/2004 | Strelioff | |
| 2008/0191055 A1 | 8/2008 | Ellsworth | |
| 2011/0271653 A1 * | 11/2011 | Vandeven | A01D 41/141 |
| | | | 56/10.2 E |
| 2011/0282554 A1 * | 11/2011 | Keye | A01M 7/0057 |
| | | | 701/49 |
| 2013/0026261 A1 | 1/2013 | Korus | |
| 2013/0037625 A1 | 2/2013 | Arenson | |
| 2013/0043326 A1 | 2/2013 | Muff | |
| 2014/0074360 A1 * | 3/2014 | Rosa | G05D 3/12 |
| | | | 701/50 |
| 2017/0049043 A1 | 2/2017 | Muff | |
| 2017/0118908 A1 * | 5/2017 | Ritland | B05B 13/005 |
| 2018/0263235 A1 * | 9/2018 | Light | B05B 3/12 |
| 2018/0368387 A1 | 12/2018 | Welte | |

* cited by examiner

BOOM HEIGHT SENSOR SYSTEMS, METHODS AND APPARATUS

BACKGROUND

When applying liquid products to crops in field, such as fertilizers, herbicides, pesticides and the like, using a liquid applicator, such as a sprayer or dribble applicator, it is desirable to maintain the boom and associated drop assemblies coupled thereto at a desired height above the ground surface. If the boom is too low, damage to the crop, or damage to the drop assemblies or other equipment attached to the boom may occur. Additionally, proper coverage of the liquid product to the crop (if spraying) may not be achieved. Likewise, if the boom is too high, excess drift of the liquid product may occur (if spraying) or if using a dribble applicator, the liquid may not be placed where desired. Boom height control systems are utilized to measure and control boom height during application of agricultural materials. The operator establishes a target height and the height control system makes adjustments to the boom to maintain the target height. Accordingly, there is a need for an improved boom height sensing system that accurately detects the height of the boom (or equipment supported below the boom) relative to the ground and to automatically adjust the boom height based on the detected height.

DESCRIPTION

Figure 1:
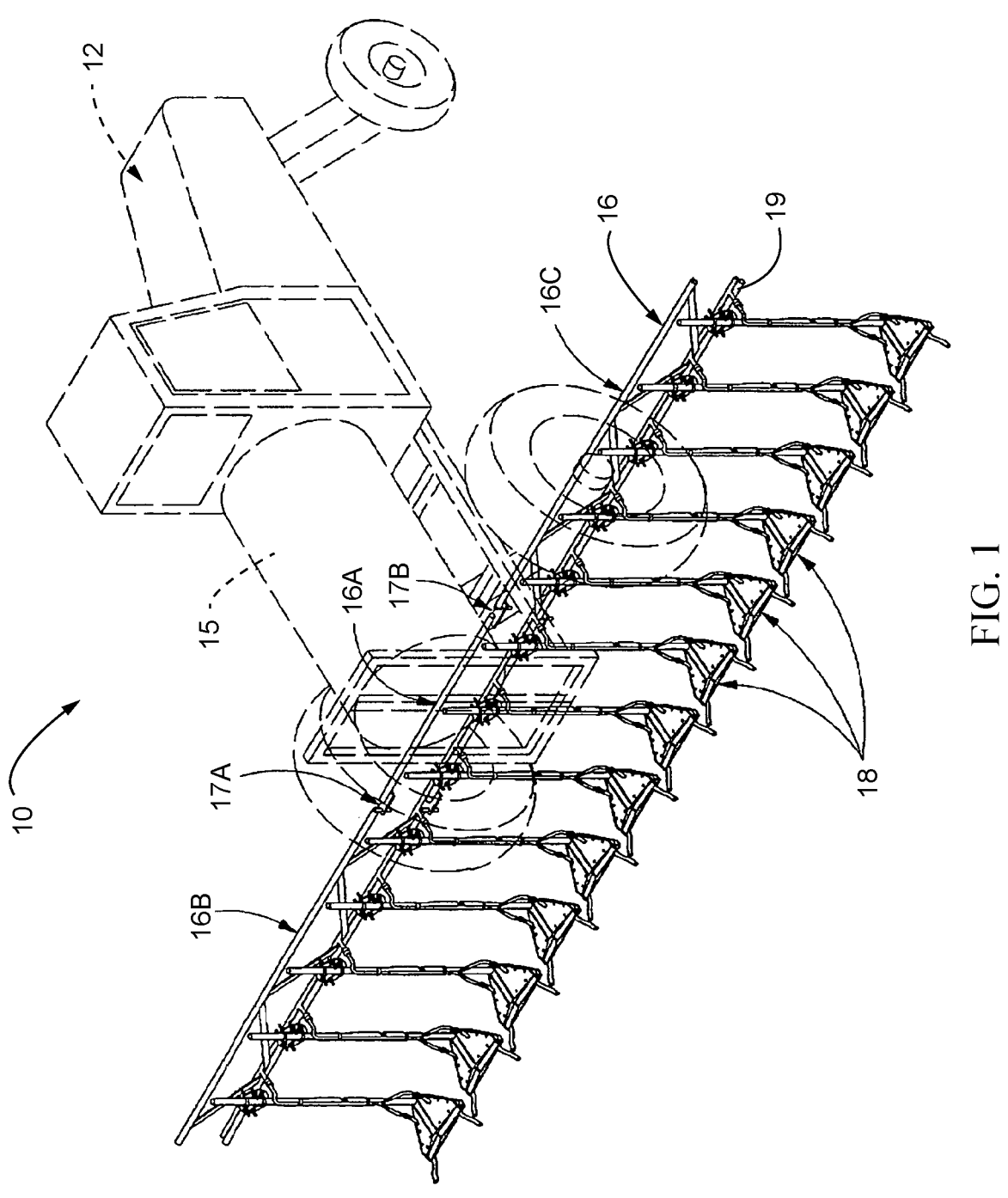
FIG. 1 is a perspective view of an embodiment of a liquid applicator.

Referring now to the drawings wherein like reference numerals designate the same or corresponding parts throughout the several views, FIG. 1 is a perspective view of an illustrative embodiment of liquid applicator implement 10, such as disclosed in U.S. Patent Publication No. US2017/0049043 (the '043 Publication), incorporated herein by reference in its entirety. The liquid applicator implement 10 includes a vehicle 12 carrying a liquid storage tank 15 and a boom 16, along which a plurality of drop assemblies 18 are laterally spaced. It should be appreciated that the term "drop assemblies" as used herein refers to any structure that extends below the boom 16 for delivering liquid product to the crops, or to the soil. It should also be appreciated that while the liquid applicator implement 10 is depicted as a self-propelled implement in FIG. 1, the liquid applicator implement 10 may be attached to a tractor via a three point hitch (not shown) or the liquid applicator implement 10 may be a towed implement that is pulled behind a tractor (not shown).

One or more distribution hoses 19 communicate liquid product from the liquid storage tank 15 on the vehicle to each of the drop assemblies 18 disposed along the boom 16. Any type and number of suitable distribution hoses 19 may be utilized and any type of suitable pumping mechanism (not shown) may be employed to communicate the liquid product from the tank 15 to the distribution hoses 19, and thereby, to the drop assemblies 18.

The boom 16 may be of any desired length, such as 60 feet, 90 feet, and 100 feet lengths, as non-limiting examples. The boom 16 may also have any suitable structural configuration, such as a single beam, multiple beams, truss configurations, or combinations thereof. Additionally, rather than the boom 16 being mounted at the rear of the vehicle 12 as shown in FIG. 1, the boom 16 may be attached at front of the vehicle 12.

The boom 16 may be mounted to the vehicle 12 in such a way as to be vertically adjustable with respect to the vehicle 12 and the ground surface. The boom 16 may also be configured to allow sections of the boom to be folded upwardly and/or rearwardly. For example, as illustrated in FIG. 1, the boom 16 may include a center section 16A, that is mounted to the vehicle 12, and with left and right wing sections 16B, 16C respectively on either end of the center section 16A connected at respective left and right joints 17A, 17B. The center section 16A and left and right wing sections 16B, 16C may be vertically adjustable as a unit with respect to the vehicle or the center section 16A and the left and right wing sections 16B, 16C may be independently vertically adjustable with respect to each other and the vehicle 12. Each of the left and right wing section 16B, 16C may pivot rearwardly with respect to the center section 16A about the respective joints 17A, 17B. Alternatively, the joints 17A, 17B may be oriented and configured to allow the respective left and right wing sections 16B, 16C to pivot upwardly with respect to the center section 16A. Having foldable boom sections allows for space-efficient storing of the implement 10 and for easier transport when traveling between fields. Additionally, foldable boom sections, permits the left and right wing sections 16B, 16C to be moved to avoid injuring or damaging standing crops when turning at the ends of the field. It should be appreciated that the boom 16 may have any number of sections such as one, two, four, five or more sections as desired with corresponding joints between sections.

Figure 2:
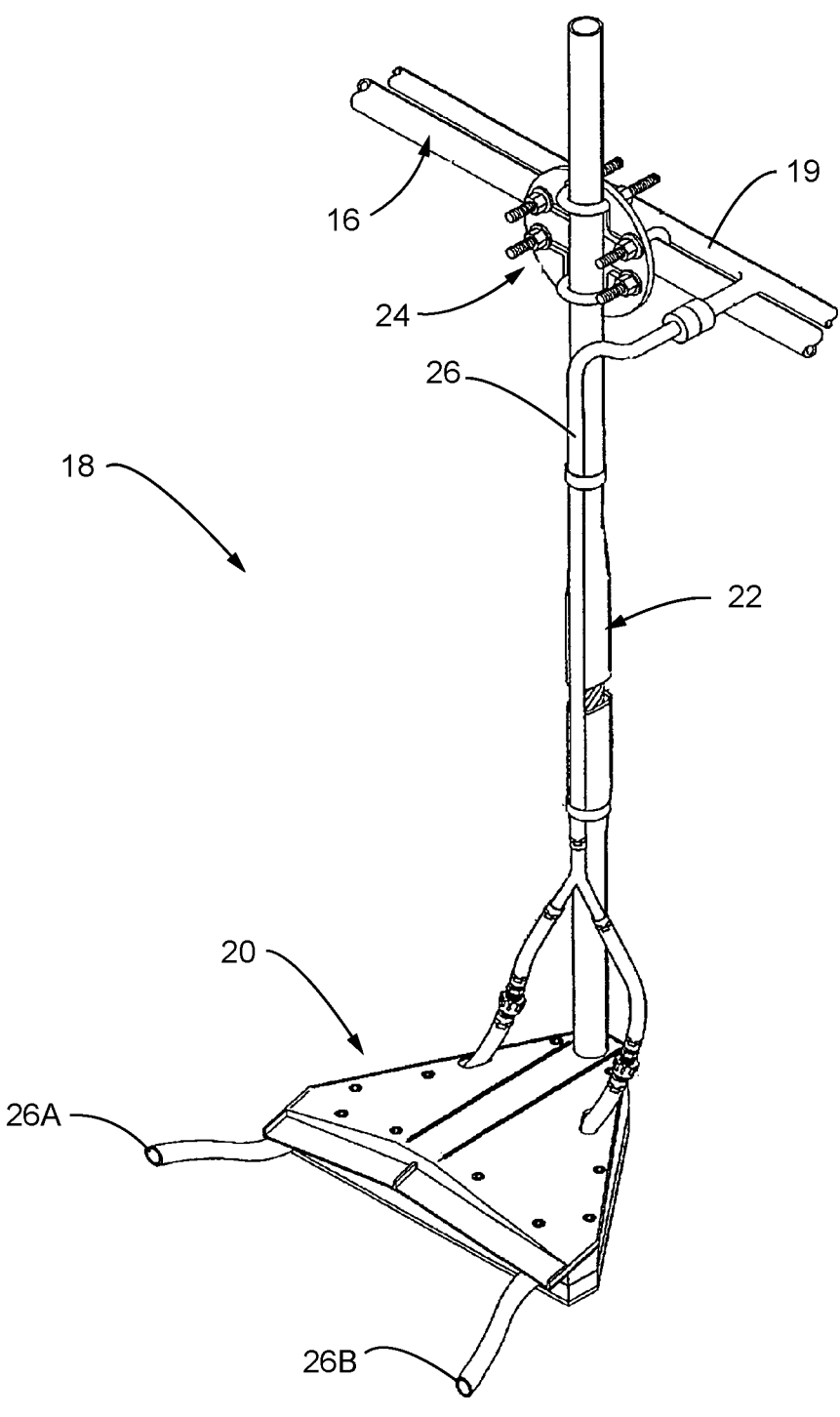
FIG. 2 is an enlarged perspective view of an embodiment of one of the drop assemblies of the liquid applicator of FIG. 1.

FIG. 2 is an enlarged perspective view of an embodiment of one of the drop assemblies 18. In this embodiment, the drop assembly includes a base unit 20 that is supported at a lower end of a riser 22 which is supported from and extends below the boom 16. The risers 22 may be rigid or flexible such that the riser may bend or flex. The drop assembly 18 includes a drop hose 26 that connects to the distribution hose 19. The drop hose 26 may split into separate lines toward the base unit 20 and the lines may diverge outwardly and rearwardly terminating into two or more laterally spaced dribble hoses 26A, 26B. As disclosed in the '043 Publication, the riser 22 may support one or more spray nozzles (not shown) for spraying liquid product onto the crops in one or more directions while the dribble hoses 26A, 26B dribble liquid product as a low pressure continuous stream directly onto the soil adjacent to the crop rows over the rhizosphere of the plants.

The drop assemblies 18 may be coupled to the boom 16 using any suitable mounting mechanism 24 to allow the drop assemblies 18 to be adjustably, laterally spaced between the crop rows according to the row spacing at with the crops are planted which may vary from 15 to 48 inch spacings. Additionally, the drop assemblies 18 may be mounted using any suitable mounting mechanism 24 to allow the riser 22 and thus the drop assemblies 18 to be vertically adjustable with respect to the boom 16 to vary the distance the drop assemblies 18 extend below the boom 16. Various mounting mechanisms 24 for coupling the drop assemblies 18 to the boom 16 are disclosed in the '043 Publication, previously incorporated by reference. The mounting mechanism 24 for coupling the drop assemblies 18 to the boom 16 may also comprise a break-away mounting mechanism, such as disclosed in U.S. Publication No. US2017/0118908, incorporated herein by reference in its entirety, configured to allow the drop assemblies 18 to deflect or pivot rearwardly from a normal, substantially vertical, operating orientation upon encountering an obstruction in the field as the vehicle 12 advances in the forward direction of travel and to return again from the deflected position to the normal substantially vertical operating orientation when the drop assembly passes the obstruction.

Figure 3:
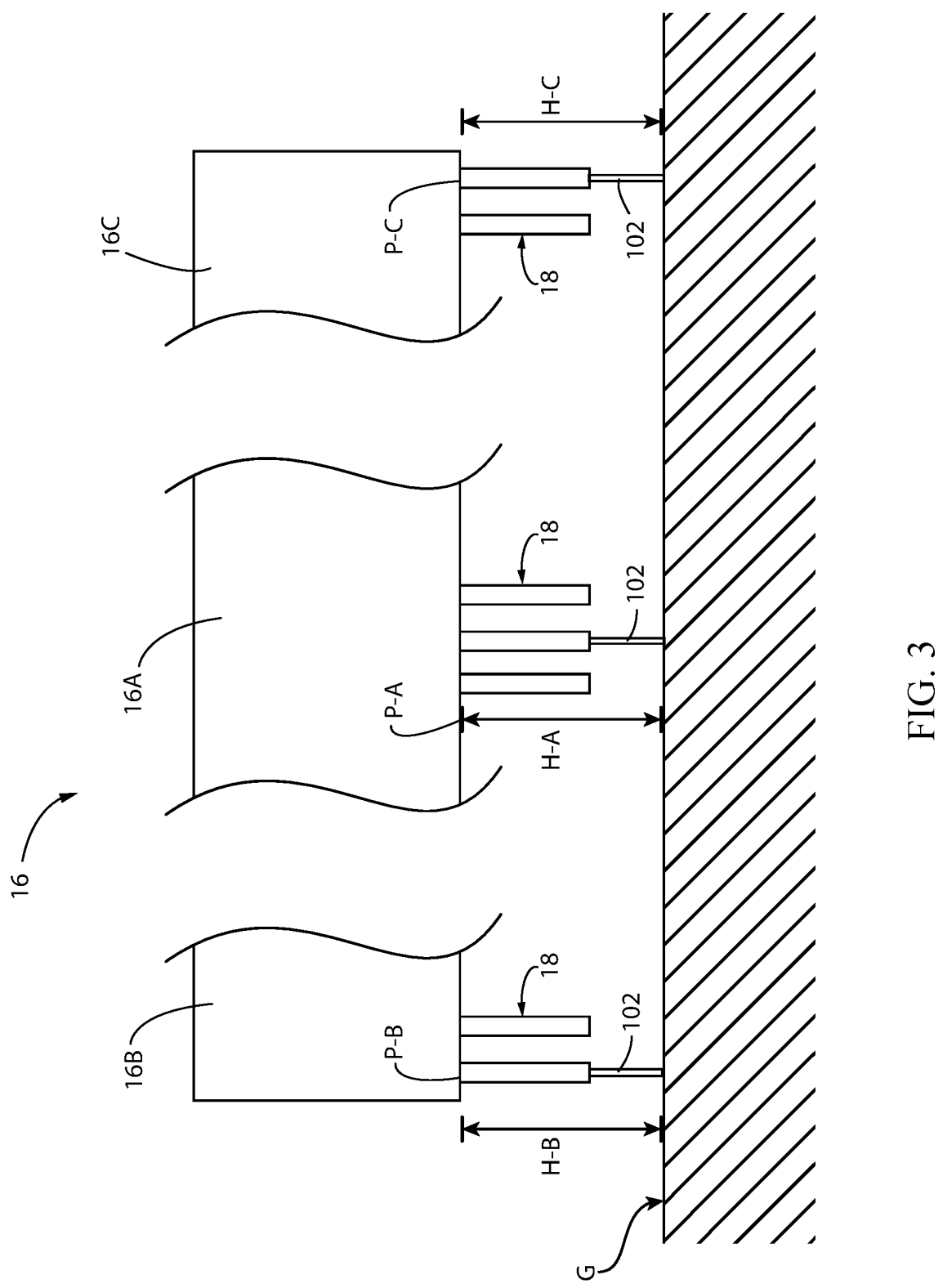
FIG. 3 is a schematic view of a boom having a plurality of height sensor assemblies.

FIG. 3 is a schematic representation of the boom 16 with a plurality of height sensor assemblies 100 (identified by reference numbers 100A, 100B, 100C) disposed laterally along the length of the boom. It should be appreciated that, although three height sensor assemblies are shown in FIG. 3, any number of height sensor assemblies 100 may be utilized, such as one, two, four, five or more height sensor assemblies. As described in more detail later, each height sensor assembly 100 is directly coupled with a corresponding drop assembly 18. The height sensor assembly may include a ground engaging arm 102 and a displacement sensor 104 (see also FIG. 5). The arm 102 pivots or moves as the elevation of the ground varies as the vehicle 12 advances through the field with respect to the drop assembly 18 or the boom 16 and/or portions thereof (e.g., sections 16A-16C). The movement of the arm 102 is detected by the displacement sensor 104. In alternative embodiments, the plurality of height sensor assemblies 100 may be coupled directly to the boom 16 or other component of the liquid applicator 10 to provide an indication of distance between the boom 16 and the ground G.

Regardless of the number utilized, the arm 102 of the height sensor assemblies 100 may be positioned to contact the ground G during operation to provide a signal indicative of the height of the boom 16 (or a portion thereof) relative to the ground G. In the particular embodiment illustrated in FIG. 3, sensor assembly 100A provides a signal indicative of a height H-A of the center boom section 16A relative to the ground G, sensor assembly 100B provides a signal indicative of a height H-B of left boom section 16B relative to the ground G and sensor assembly 100C provides a signal indicative of a height H-C of the right boom section 16C relative to the ground G. The heights H-A, H-B and H-C as illustrated in FIG. 3 are calculated from a lowermost portion of each of the boom sections 16A-16C, although other positions of the boom 16 may be used to calculate the heights H. In the embodiment illustrated, the lowermost portion of the boom sections 16A-16C are illustrated as planes P-A, P-B and P-C, representing a lower plane of each of the boom sections 16A-16C, respectively. It will be appreciated that, during operation, planes P-A, P-B and P-C may not necessarily be co-planar and may not necessarily be parallel to one another.

Figure 4:
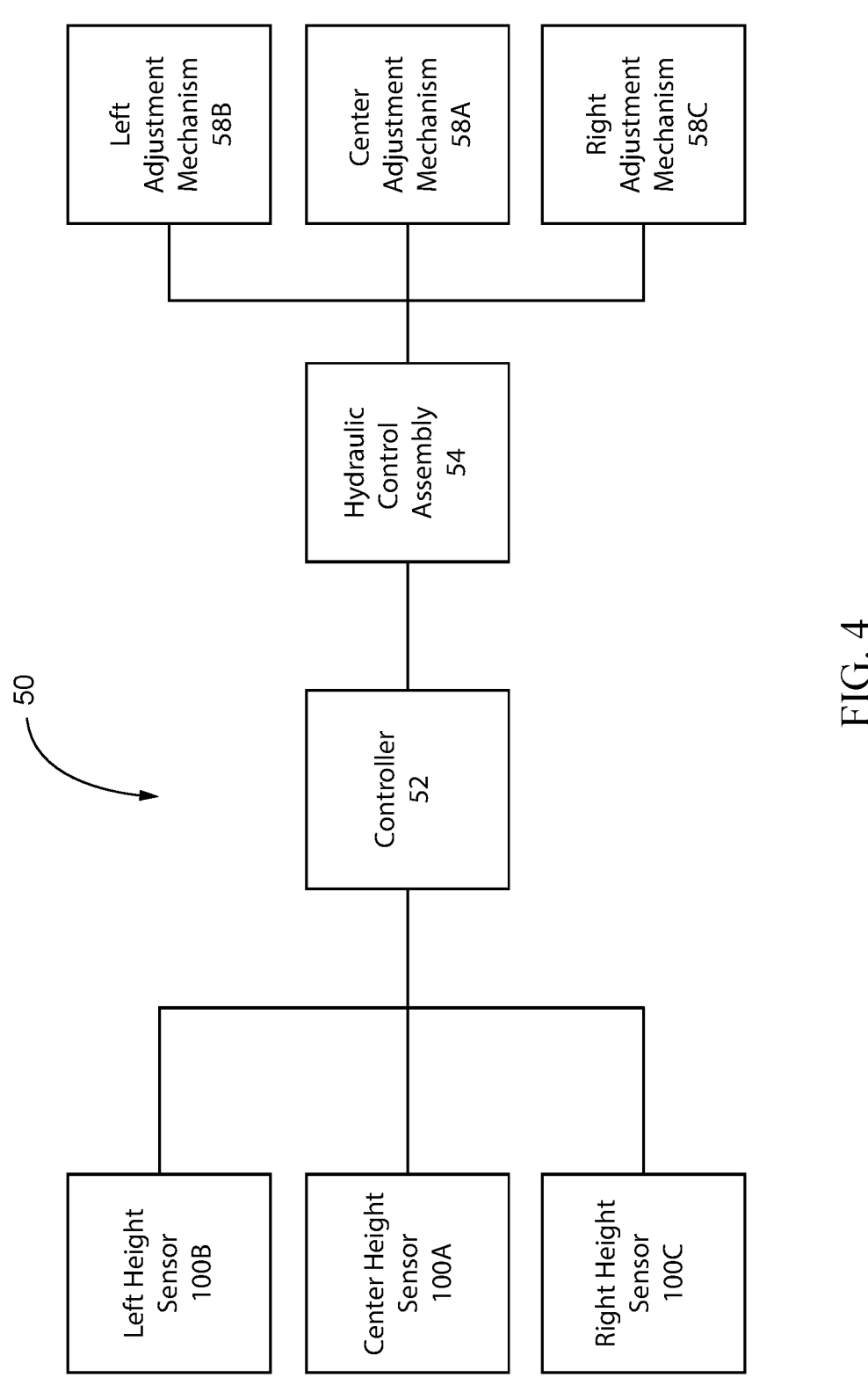
FIG. 4 is a schematic block diagram of a height control system.

FIG. 4 is a block diagram of one embodiment of a height control system 50-1 for the boom 16. Signals from each of the height sensor assemblies 100A-100C are communicated to the height control system 50-1 so as to adjust the height of the boom 16 and/or adjust the height of each of the boom sections 16A-16C. In particular, the height control system 50-1 includes a controller 52 and a hydraulic control assembly 54 to adjust the boom 16 and/or individual boom sections 16A-16C. The controller 52 receives signals indicative of height from the height sensor assemblies 100A, 100B, 100C, which signals correspond to distances indicative of heights H-A, H-B, H-C, respectively. The controller 52 receives the signals from the height sensor assemblies 100A-100C and in response sends a message to hydraulic control assembly 54.

The hydraulic control assembly 54 operates to communicate a desired control signal to one or more corresponding adjustment mechanisms 58, identified as center adjustment mechanism 58A, left adjustment mechanism 58B and right adjustment mechanism 58C, so as to adjust the height of the boom 16 and/or each of the boom sections 16A-16C. In one embodiment, the center adjustment mechanism 58A moves each of the sections 16A-16C vertically with respect to the vehicle 12, while the left adjustment mechanism 58B adjusts the left boom section 16B and the right adjustment mechanism 58C adjust the right boom section 16C, with respect to the center boom section 16A. The center adjustment mechanisms 58A may comprise a hydraulic actuator coupled between a frame of the vehicle 12 and the center section 16A. The left adjustment mechanism 58B may comprise a hydraulic actuator coupled between the center section 16A and the left wing section 16B. The right adjustment mechanism 58C may comprise a hydraulic actuator coupled between the center section 16A and the right wing section 16C.

Figure 11:
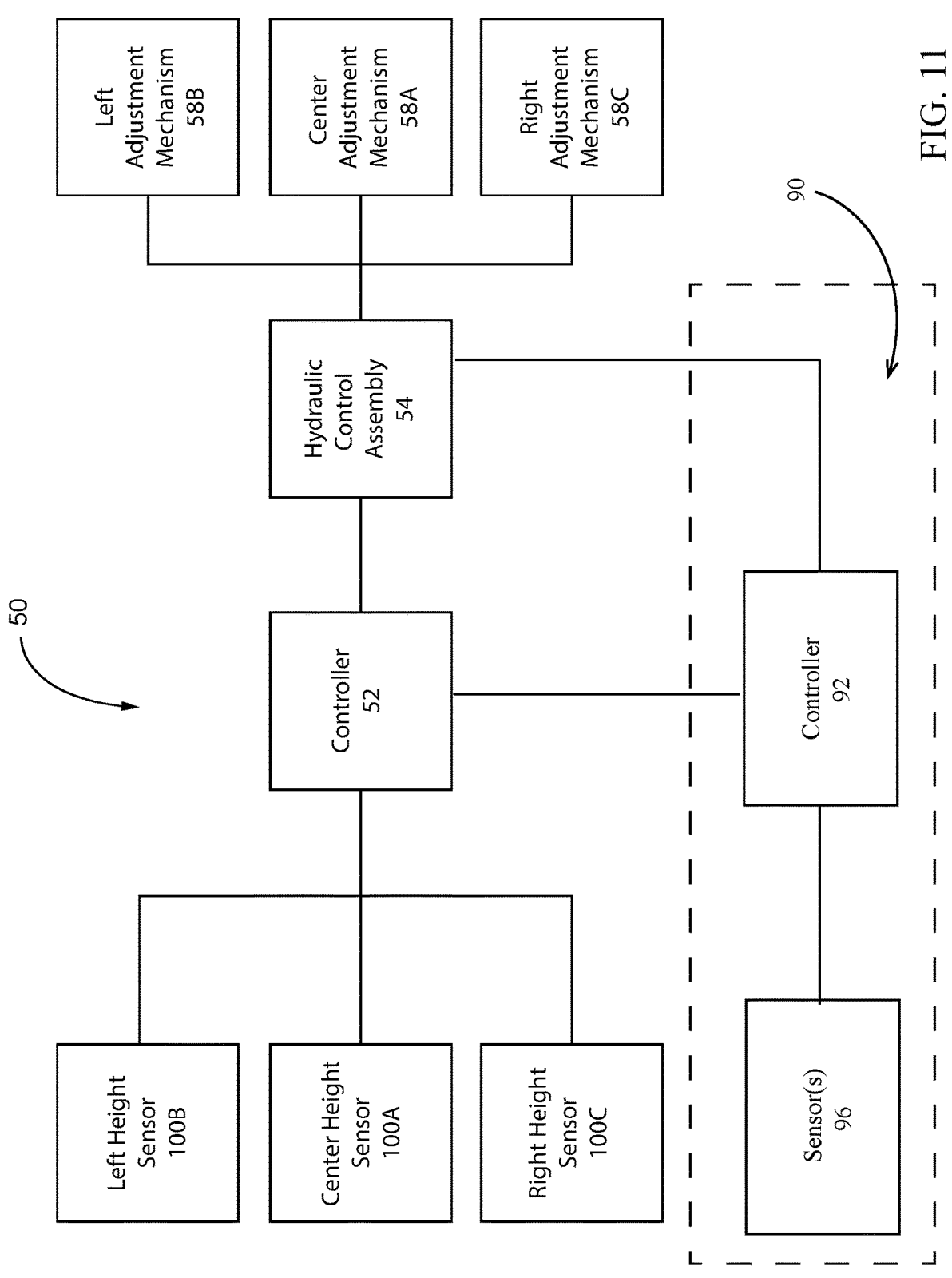
FIG. 11 is a schematic diagram of another embodiment of a height control system for retrofitting an existing height control system.

FIG. 11, is a block diagram of another embodiment of a height control system 50-2 that may be used to retrofit an existing height control system on a vehicle, such as an original equipment manufacturer's (OEM's) height control system or previously installed aftermarket height control system, a remote height control system, etc. (hereafter collectively referred to as an "OEM height control system"

for simplicity and designated by reference number 90. The OEM height control system 90 includes its own controller (hereafter referred to as an "OEM controller" designated by reference number 92) which is in communication with its own height sensors (hereinafter referred to as "OEM height sensors" designated by reference number 96). As in the previous embodiment of the height control system 50-1 described in connection with FIG. 4, the height control system 50-2 includes a controller 52 and a hydraulic control assembly 54 to adjust the boom 16 and/or individual boom sections 16A-16C via corresponding height adjustment mechanisms 58A, 58B, 58C. The controller 52 (or one or more height sensor assemblies 100 and/or another component thereof) is in data communication with the OEM controller 92 (or other component). The height control system 50-2 is configured to communicate its raw height measurements and/or processed height measurements to the OEM controller 92 which is in data communication with hydraulic control assembly 54. The height measurements of the height control system 50-2 are then used by the OEM height control system 90 to generate command signals for communication to the hydraulic control assembly 54. In some embodiments, the controller 52 (or other component of the system 50-2) is configured to modify height measurements from the height sensor assemblies 100 such that the height measurements correspond to height measurements that would have been made by the OEM sensors 96. For example, in some embodiments one or more of the OEM sensors 96 may be disposed at a height offset HO above the height sensor assemblies 100 and/or the ground surface G. In such embodiments, the controller 52 adds the height offset HO to the height measurements of the height sensor assemblies 100 to generate a processed height measurement and then communicates the processed height measurement to the OEM controller 92, e.g., for use in commanding the hydraulic control assembly 54.

Figure 5:
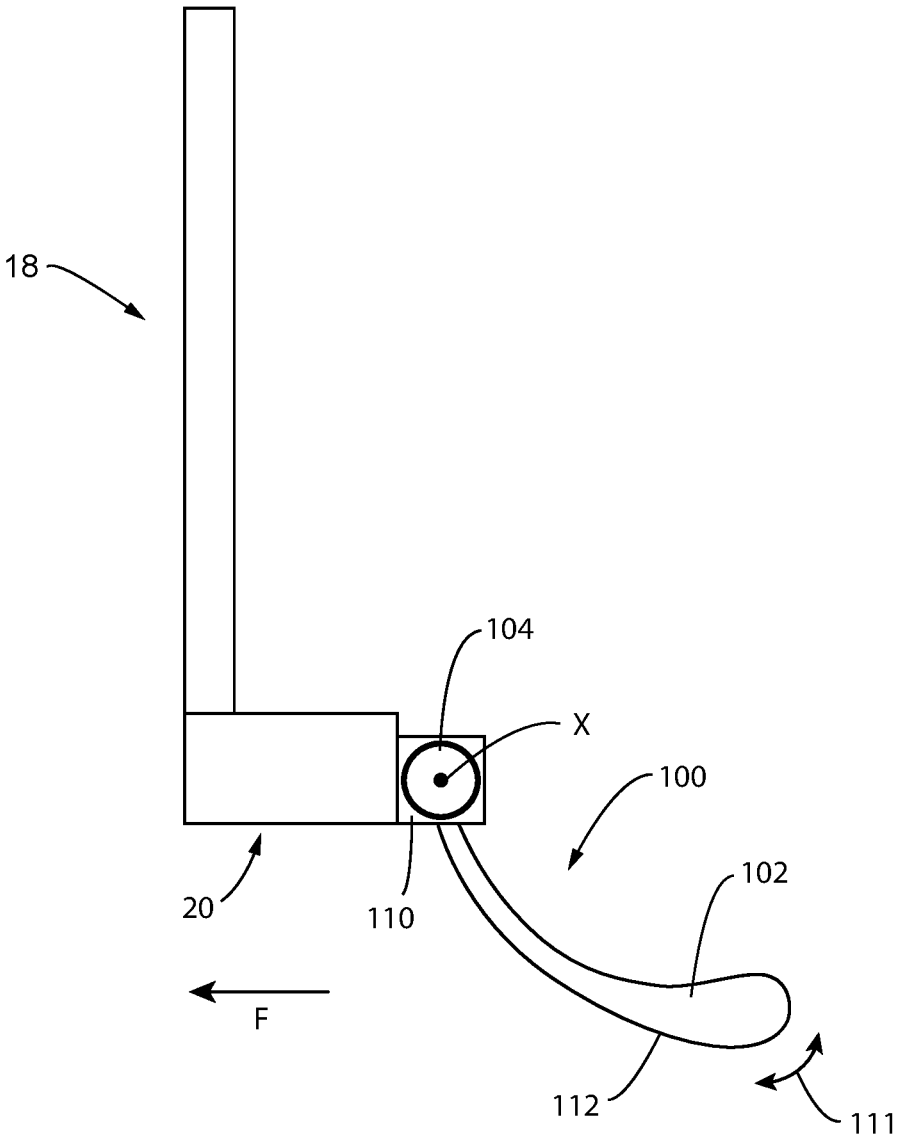
FIG. 5 is a side elevation view of an embodiment of a height sensor assembly disposed on a drop assembly.

FIG. 5 is a schematic side view of an embodiment of a height sensor assembly 100 connected with a drop assembly 18. In particular, the height sensor assembly 100 is directly coupled with the base unit 20 of the drop assembly 18 through a bracket 110. The displacement sensor 104 is coupled with the bracket 110 and is further connected with the ground engaging arm 102 that is rotationally coupled to the bracket 110. The arm 102 pivots with respect to the bracket 110 about an axis X and as indicated by arrow 111 as the ground elevation changes with respect to the base unit 20 or bracket 110. The leading edge 112 of the arm 102 may be curved so as to minimize drag against the ground. The arm 102 may be made of a metal (e.g., steel), a composite material or other wear resistant material so as to withstand prolonged contact with the ground during operation of the liquid applicator 10. In this embodiment, the displacement sensor 104 may be a rotation sensor, that senses or detects relative movement of the arm 102 with respect to the bracket 110 about axis X. Examples of rotational sensors include, but are not limited to, optical sensors, potentiometers and Hall effect sensors.

Regardless of the type of displacement sensor used, the arm 102 serves as a feeler that includes a leading edge 112 positioned to extend below the base unit 20 and which contacts or engages the ground as the vehicle advances in the forward direction of travel F. The ground contact with the leading edge 112 of the arm 102 is translated to rotational movement of the arm 102 about axis X. This rotational movement is sensed by the displacement sensor 104, which generates a signal (e.g., a voltage magnitude) that is sent to the controller 52. Since the rotational movement in this embodiment is indicative of a height of the base assembly 20 relative to the ground, the controller 52 can be calibrated to convert the signal magnitude from the displacement sensor 104 to the height of the boom 16 and/or corresponding boom sections 16A-16C relative to the ground. The controller 52, in one embodiment, is CAN-enabled and can send a corresponding message to the hydraulic control assembly 54 as desired to modify the height of the boom 16 and or the boom sections 16A-16C.

Figure 6:
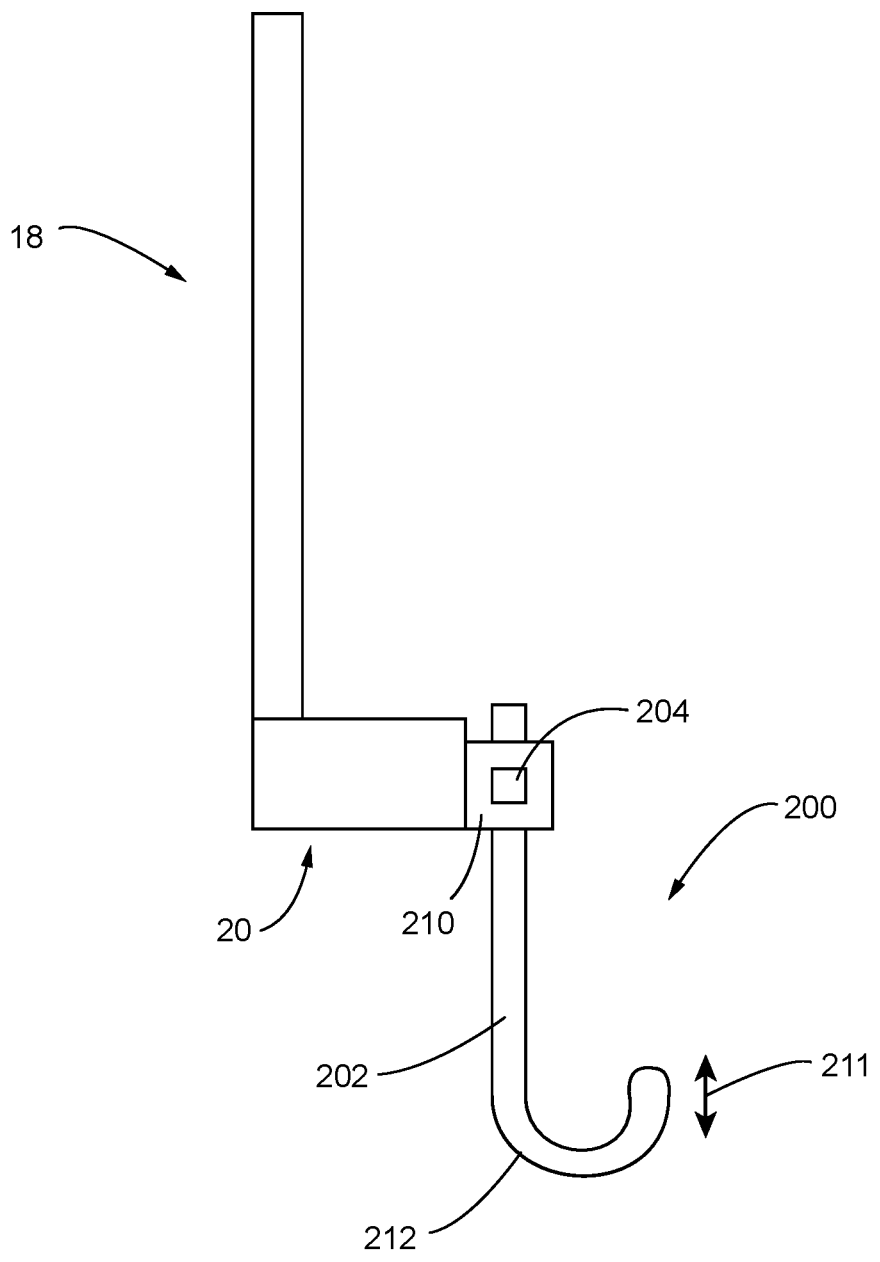
FIG. 6 is a side elevation view of another embodiment of a height sensor assembly disposed on a drop assembly.

FIG. 6 illustrates an embodiment of an alternative height sensor assembly 200 mounted to a drop assembly 18. The height sensor assembly 200 includes a ground engaging arm 202 that is coupled via a bracket 210 to the base unit 20 of the drop assembly 18, but in this embodiment, the ground engaging arm 202 is displaced linearly (i.e., vertically) with respect to the base unit 20 of the drop assembly 18 rather than being rotationally displaced as described in connection with the embodiment of FIG. 5. The arm 202 may be curved rearwardly with a leading edge 212. Accordingly, in this embodiment a linear displacement sensor 204 senses or detects the linear movement of the arm 202 in a direction indicated by arrow 211 as the ground elevation changes with respect to the base unit 20 or bracket 210. This linear movement is sensed by the linear displacement sensor 204, which generates a signal (e.g., a voltage magnitude) that is sent to the controller 52. Since the linear movement in this embodiment is indicative of a height of the base assembly 20 relative to the ground, the controller 52 can be calibrated to convert the signal magnitude from the displacement sensor 204 to the height of the boom 16 and/or corresponding boom sections 16A-16C relative to the ground.

Figures 7, 7A:
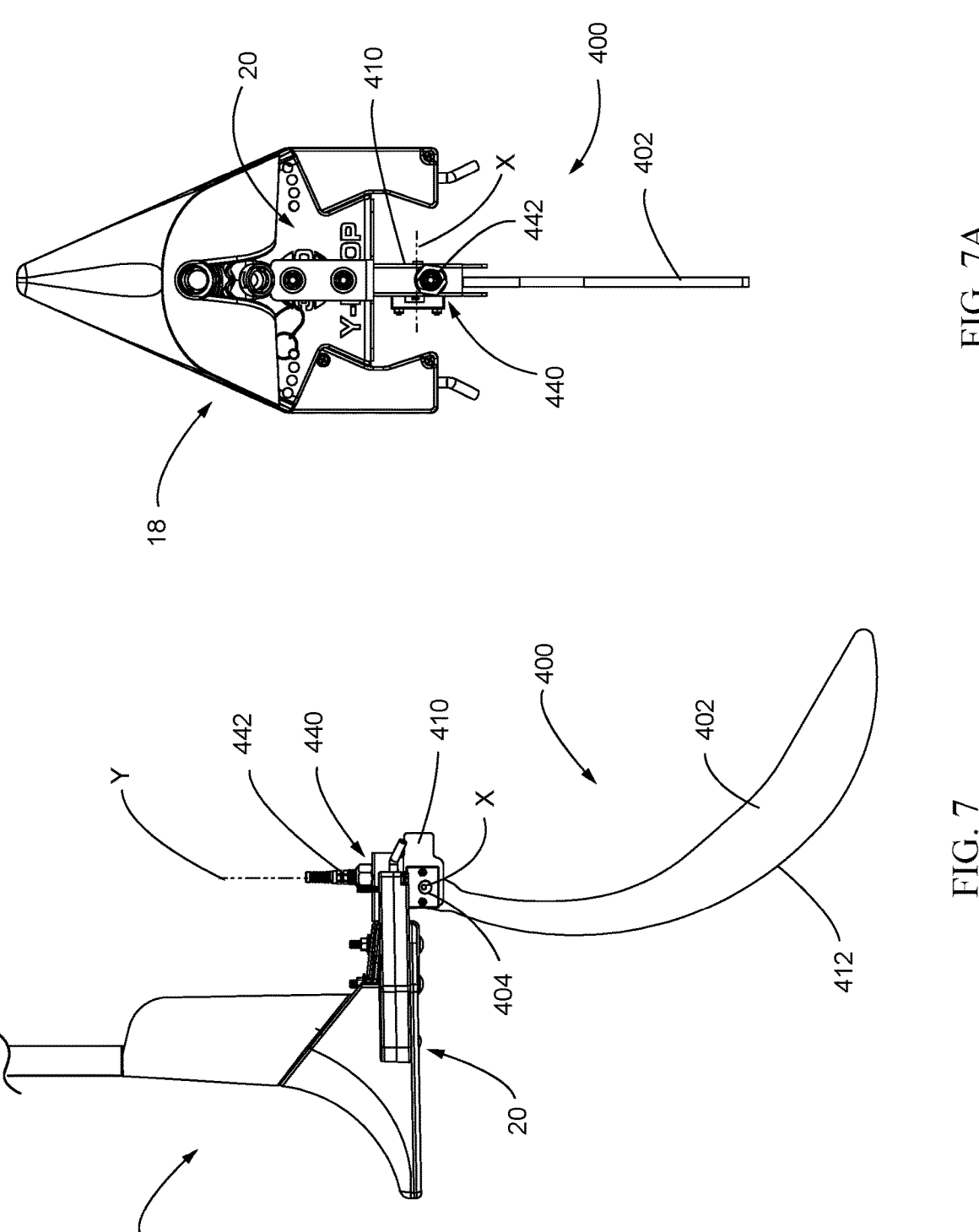
FIG. 7 is a side elevation view of another embodiment of a height sensor assembly disposed on a drop assembly with a vertical pivot assembly for the ground engaging arm showing the arm positioned when the vehicle is traveling in a generally straight forward position.
FIG. 7A is a top plan view of the height sensor assembly of FIG. 7.
Figures 8, 8A:
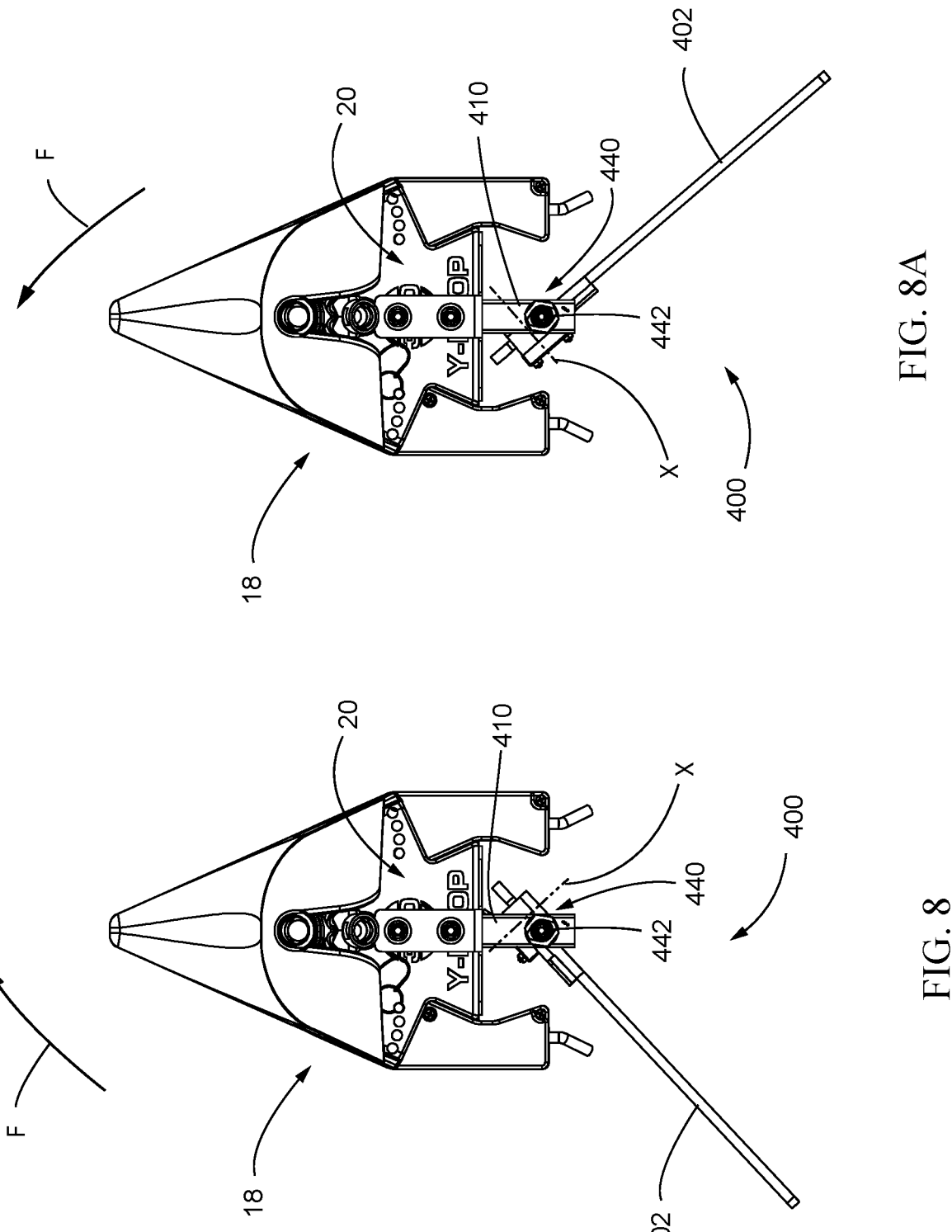
FIGS. 8 and 8A are top plan views of the height sensor of FIG. 7, but showing the arm pivoted about the vertical pivot assembly to either side representing the position of the arm if the vehicle is turning or traveling along a curve.

FIGS. 7-9B illustrate another embodiment of a height sensor assembly 400 mounted to a drop assembly 18. Referring to FIG. 7, the sensor assembly 400 is illustrated as being mounted to a base unit 20 of the drop assembly 18. The height sensor assembly 400 includes a ground engaging arm 402 having a leading edge 412 positioned to extend below the base assembly 20. The arm 402 is pivotally coupled to a bracket 410 for pivoting about a generally horizontal axis X. A displacement sensor 404 (e.g., a rotational sensor such as an optical sensor, potentiometer, Hall effect sensor, etc.) is configured to detect or sense rotational displacement of the arm 402 about the horizontal axis X.

Figures 9, 9A, 9B:
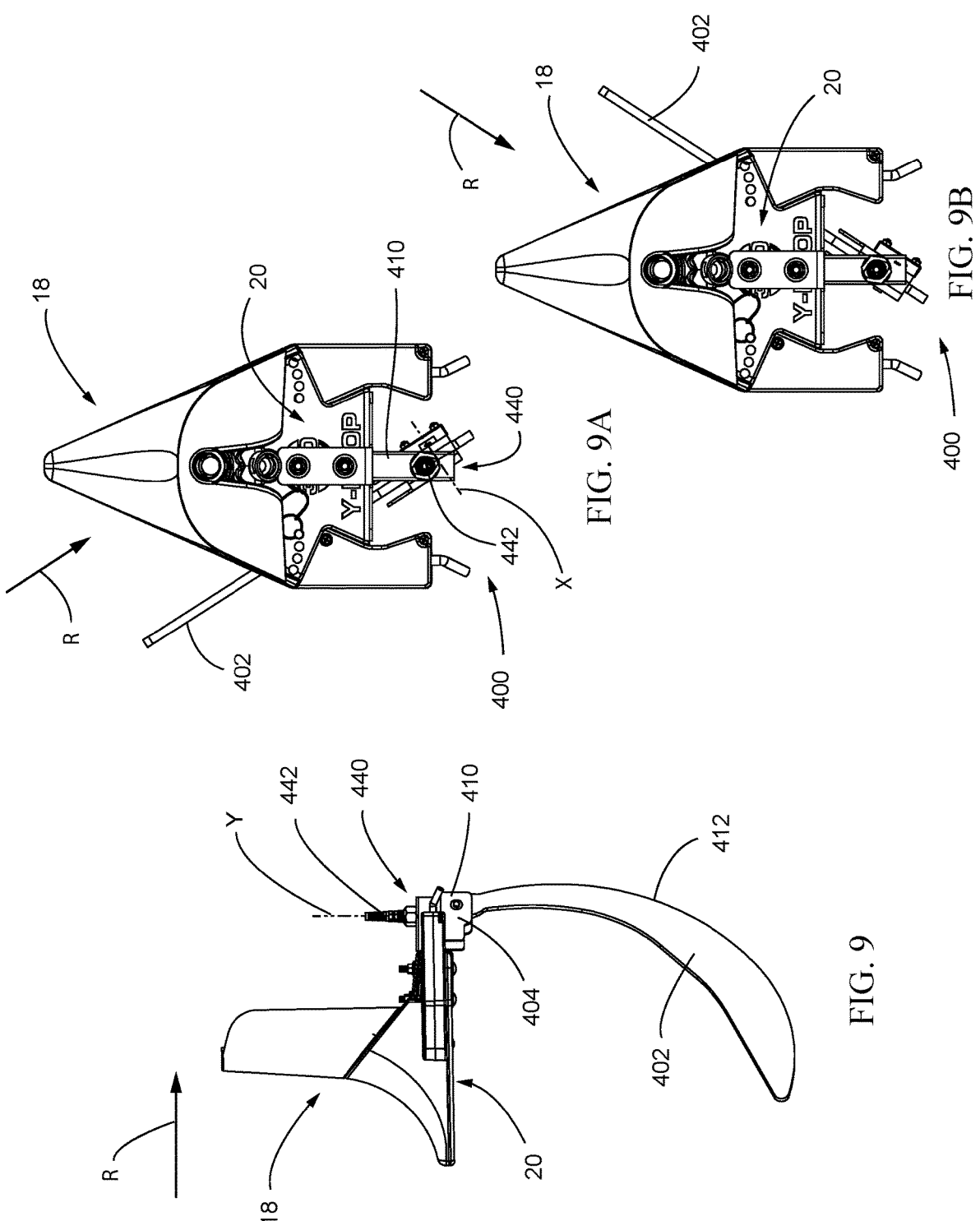
FIG. 9 is a side elevation view of the height sensor assembly of FIG. 7, but showing the arm pivoted about the vertical pivot assembly representing the position of the arm if the vehicle is moving in reverse.
FIGS. 9A and 9B are top plan views of the height sensor of FIG. 9, but showing the arm pivoted about the vertical pivot assembly to either side representing the position of the arm if the vehicle is turning while reversing.

The height sensor assembly 400 may also be pivotally coupled to the base unit 20 via a pivot assembly 440 having a pin, rod or the like 442 defining a generally vertical pivot axis Y about which the arm 402 is able to pivot or rotate during operation. FIGS. 7 and 7A are side elevation and top plan views, respectively, of the height sensor assembly 400 showing the arm 402 in a first position (which is the normal or average position) when the vehicle is traveling in a generally straight forward direction of travel F. As the vehicle 12 travels around a curve turning to the right as represented by the forward direction of travel F in FIG. 8, the arm 402 will tend to rotate in the opposite direction of the turn (i.e., to the left in FIG. 8) about the vertical pin 442 of the pivot assembly 440. Similarly, as the vehicle 12 travels around a curve turning to the left as represented by the forward direction of travel F in FIG. 8A, the arm 402 will tend to rotate in the opposite direction of the turn (i.e., to the right left in FIG. 8A) about the vertical pin 442 of the pivot assembly 440. As shown in FIG. 9, which is the same side elevation view as in FIG. 7, but with the arrow R indicating the reverse direction, the arm 402 will rotate about the vertical pin 442 of the pivot assembly 440, such that it in the opposite direction. Likewise, as shown in the top plan views of FIGS. 9A and 9B, if the vehicle is reversing while turning in either direction as indicated by the arrow R, the arm 402 will rotate about the vertical pin 442 of the pivot assembly 440, in the opposite direction.

Figure 10:
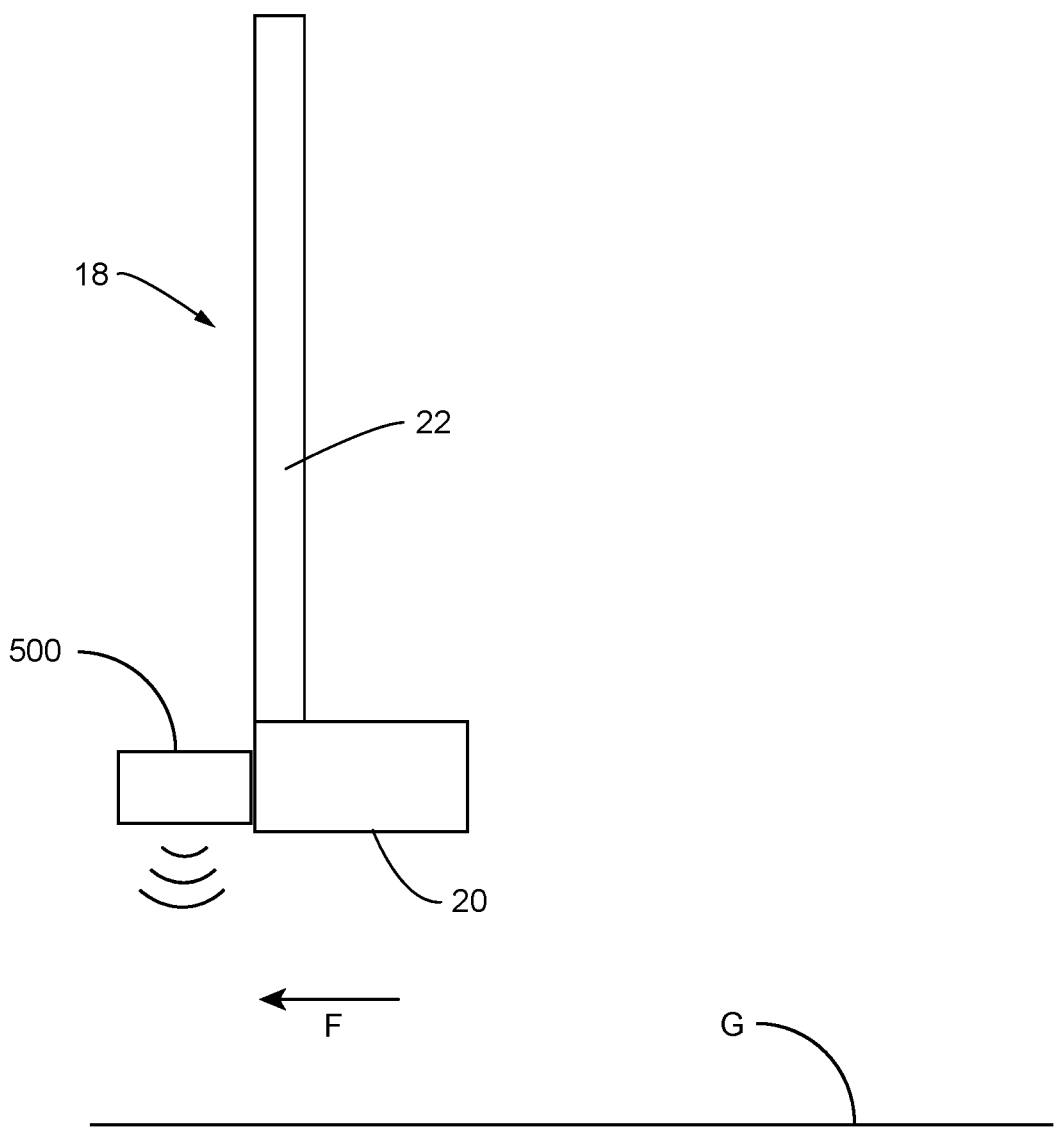
FIG. 10 is a side elevation view of another embodiment of a non-contact height sensor assembly.

FIG. 10 illustrates another embodiment of a height sensor assembly 500 in the form of a non-contact sensor, such as an optical sensor, thermal sensor, acoustic sensor, ultrasonic sensor, reflectivity sensor, or other type of non-tactile proximity sensor, which is mounted to drop assembly 18 and disposed to sense (e.g., determine, detect, estimate, generate a signal corresponding to) a proximity with the ground G. The non-contact sensor 500 is mounted to and/or supported on the base unit 20 (e.g., on a front side, rear side, bottom side or top side thereof) and in some embodiments is additionally or alternatively mounted to and/or supported on the riser 22.

It should be appreciated that, although FIGS. 3 and 11 refer to the height sensor assemblies by reference number 100, any of the other height sensor embodiments 200, 400, 500 may be utilized.

Figure 12:
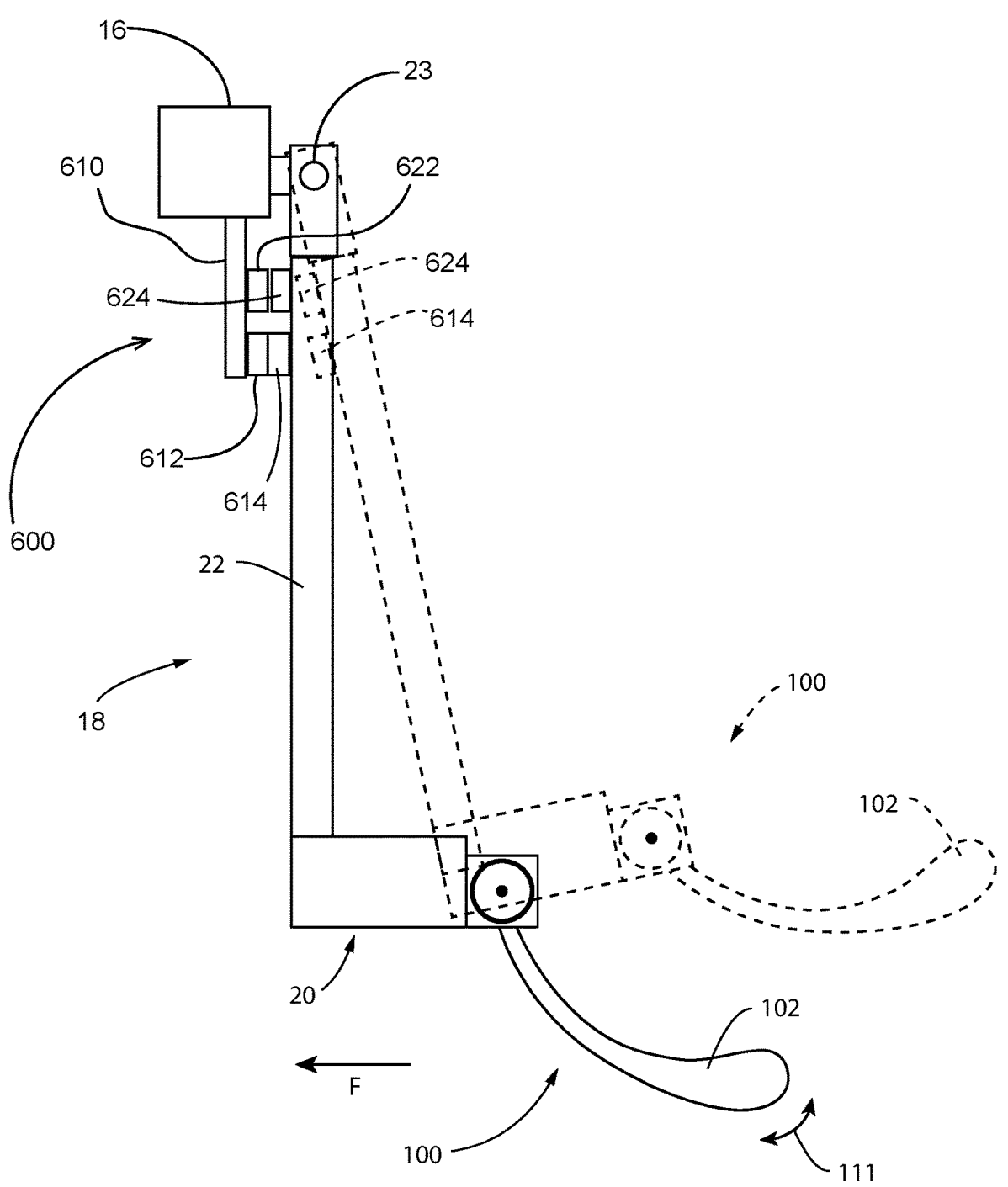
FIG. 12 is a side elevation view of an embodiment of a height sensor assembly including an embodiment of a breakaway sensor assembly.

Referring to FIG. 12, an embodiment of a drop assembly 18 is illustrated substantially the same as the drop assembly in FIG. 5, but including a breakaway assembly 600. In this embodiment, the drop assembly 18 is pivotally coupled at a pivot 23 to the boom 16. A bracket 610 or other structure is supported by the boom 16. A breakaway sensor 622 (e.g., Hall-effect sensor or other proximity sensor, etc.) is supported on the bracket 610 or optionally otherwise supported by the boom 16. A contact 624 (e.g., metal plate, etc.) is provided on the drop assembly 18 and disposed to be detected by the breakaway sensor 622 when the drop assembly 18 is in the normal, substantially vertical operating orientation as shown in FIG. 12. When the drop assembly "breaks away" (i.e., pivots rearwardly about the pivot 23 as shown in dashed lines) from its normal, substantially vertical operating orientation (e.g., upon encountering the ground surface, rocks or other obstructions) the breakaway sensor generates a modified signal associated with a breakaway event.

In some embodiments, one or more springs (not shown) such as a torsion spring or tension spring is disposed to resiliently return the drop assembly 18 to its normal, substantially vertical operating orientation after the obstruction is passed.

In some embodiments, a magnet 612 is provided on the bracket 610 or the drop assembly 18 and is disposed to magnetically attach to a magnetic contact 614 (e.g., metal plate, etc.) or other structure in order releasably retain the drop assembly in the normal, substantially vertical operating orientation.

In various embodiments, one, all or a plurality of drop assemblies 18 along the length of boom 16 may include a breakaway assembly 600 or other breakaway sensor.

Figure 13:
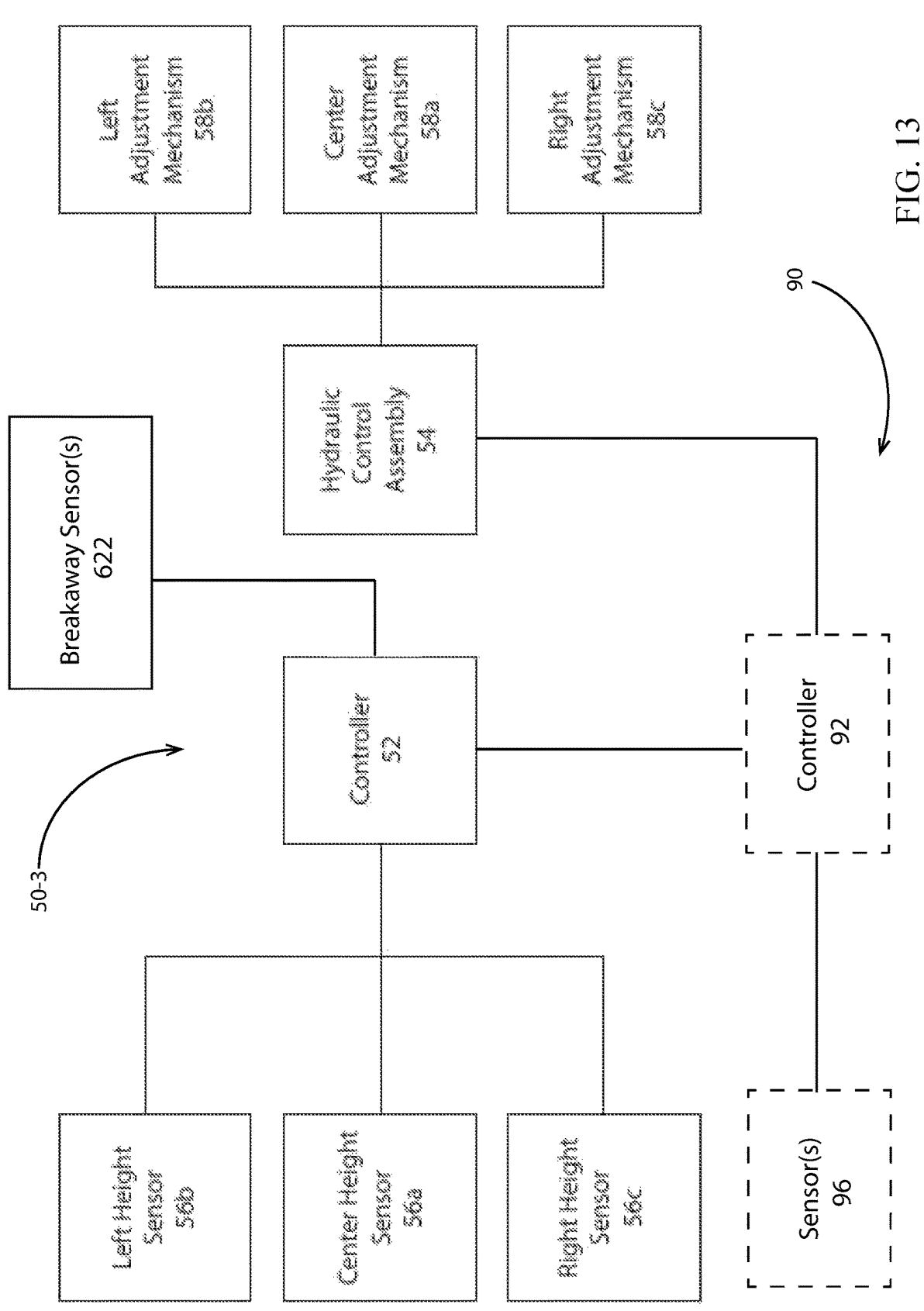
FIG. 13 a schematic diagram of yet another embodiment of a height control system comprising one or more breakaway sensors.

Referring to FIG. 13, another embodiment of a height control system 50-3 is schematically illustrated including one or more breakaway sensors 622. Each breakaway sensor 622 is in data communication with the controller 52. The system 50-3 may include an OEM controller 92 which controls the hydraulic control assembly 54; in other embodiments, the controller 52 controls the hydraulic control assembly 54.

Figure 14:
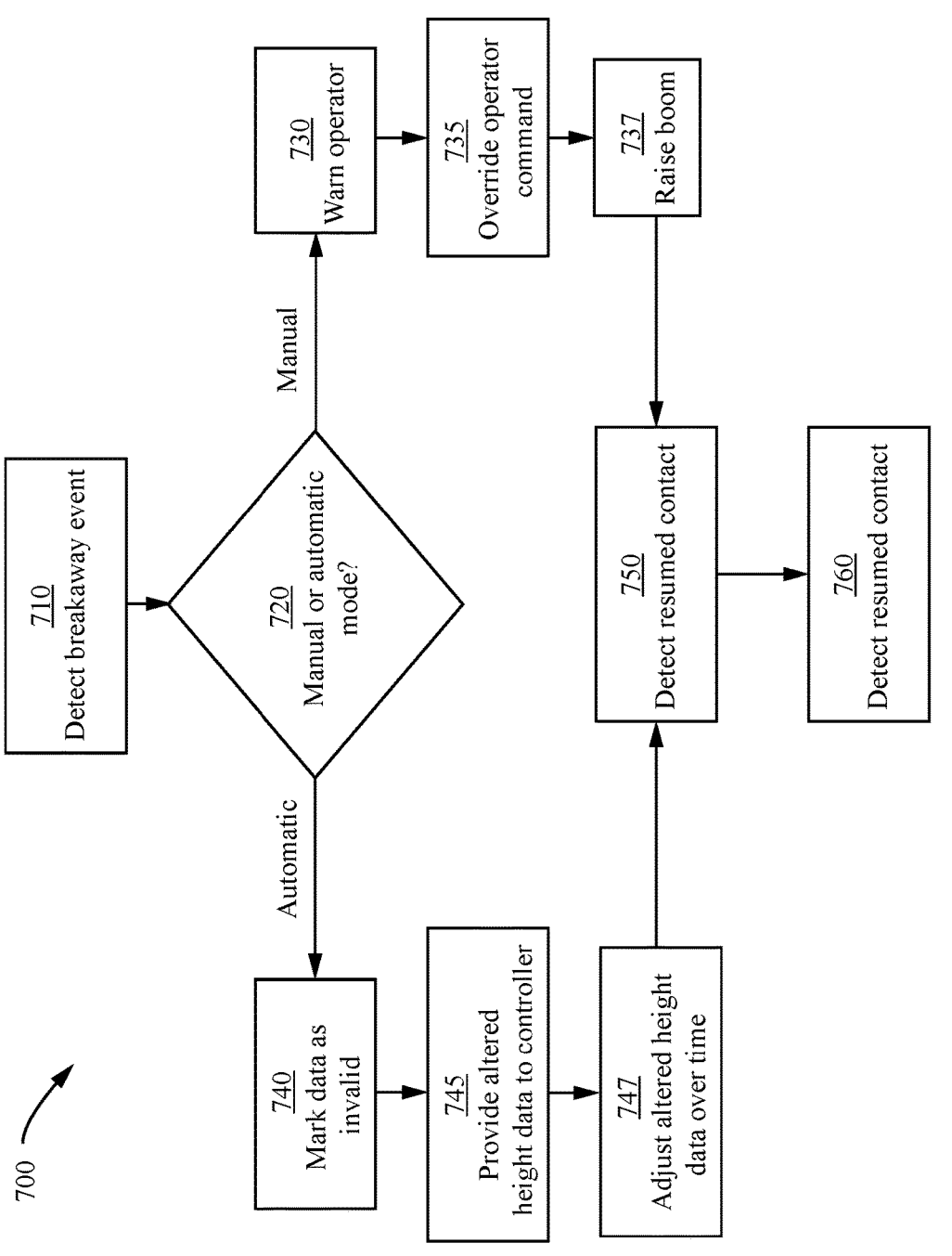
FIG. 14 schematically illustrates an embodiment of a method for controlling a height control system.

Referring to FIG. 14, an embodiment of a method 700 for controlling the height control system 50-3 (or other height control system embodiment) is illustrated. At step 710 the system 50-3 detects a breakaway event (e.g., a breakaway sensor detects that the associated drop assembly 18 is in an at least partially raised and/or breakaway position). At step

720 the system 50-3 determines whether the system is in a manual or automatic mode (e.g., based on a prior user input).

In the manual mode, at step 730 the system 50-3 may warn the operator (e.g., visually, audibly, etc.) of a breakaway event. At step 735 the system 50-3 may override a manual operator command (e.g., a command to raise or lower the boom) due to the breakaway event. At step 737, the system 50-3 may raise the boom in order to resolve the breakaway event (e.g., allowing the drop assembly to return the drop assembly 18 to the lowered or normal, substantially vertical operating orientation).

In the automatic mode, at step 740 the system 50-3 may mark data (e.g., height data, application data, etc.) gathered after the breakaway event as invalid (e.g., non-trusted, not to be used in further calculations, etc.). At step 745 the system 50-3 may provide altered height data (e.g., data offset from the measured height data provided by the height sensor associated with the same drop assembly as the breakaway sensor reporting the breakaway event) to the controller (e.g., OEM controller or other controller used to control the height of the boom). At step 757, the system 50-3 may adjust the altered height data over time. For example, in some embodiments, the system applies an initial offset to the height data which is slowly increased over time. In some examples, as a result the system raises the boom by a small increment and then by progressively increased increments.

At step 750, the system 50-3 may detect resumed contact of the breakaway sensor (e.g., resolution of the breakaway event which may indicate that the drop assembly is lowered or in the normal, substantially vertical operating orientation). At step 760, the system 50-3 returns to normal operation.

Various modifications to the embodiments and the general principles and features of the apparatus, systems and methods described herein will be readily apparent to those of skill in the art. Thus, the foregoing disclosure is not to be limited to the embodiments of the apparatus, systems and methods described herein and illustrated in the drawing figures, and should be interpreted broadly to include all variations and modifications coming within the scope of the appended claims and their legal equivalents.

The invention claimed is:

1. A liquid applicator implement for applying a liquid product to an agricultural field, comprising:
   a boom operably supported from a vehicle, the boom having a working position and a folded position, wherein in the working position, the boom extends transverse to a direction of travel of the vehicle such that the boom has a first outer end and a second outer end, each laterally outward from a centerline of the vehicle;
   a plurality of drop assemblies spaced along the boom between the first outer end and the second outer end of the boom, each of the plurality of drop assemblies including:
   a riser having an upper end and a lower end, the lower end extending downwardly from the boom toward a ground surface;
   a base unit supported at the lower end of the riser, the base unit supporting at least one tube, the at least one tube having an inlet end and an outlet end, the inlet end in fluid communication with a liquid product from a liquid source, the outlet end delivering the liquid product to the ground surface;
   wherein the base unit of at least one of the plurality of drop assemblies supports a height sensor assembly, the height sensor assembly including:

a pivot assembly pivotally supported from the base unit about a generally vertical pivot axis;

a ground engaging arm pivotally supported from the pivot assembly about a generally horizontal pivot axis, the ground engaging arm having a leading edge extending below the base unit and in engagement with the ground surface when the boom is in the working position, whereby as a distance between the base unit and the ground surface changes as the liquid applicator implement traverses the field, the ground engaging arm rotates about the generally horizontal axis;

a rotation sensor disposed to detect rotational movement of the ground engaging arm about the generally horizontal axis, the rotation sensor generating a height signal indicative of a distance between the base unit and the ground surface;

wherein, when the implement moves in a forward direction of travel, the pivot assembly pivots about the generally vertical axis such that the leading edge of the ground engaging arm is oriented toward the forward direction of travel;

wherein, when the implement moves in a reverse in direction of travel, the pivot assembly pivots about the generally vertical axis such that the leading edge of the ground engaging arm is oriented toward the reverse direction of travel;

a controller responsive to the generated height signal to actuate a boom height adjustment mechanism to raise the boom relative to the ground surface upon the generated height signal indicating a distance to the ground surface below the base unit is less than a predetermined distance.

2. The liquid applicator implement of claim 1, wherein the at least one drop assembly that includes the height sensor assembly includes a breakaway assembly, the breakaway assembly pivotally coupling the riser of the at least one drop assembly to the boom such that the riser of the at least one drop assembly is movable between a normal operating position and a breakaway position, wherein in the normal operating position, the riser is substantially vertically oriented and wherein in the breakaway position, the lower end of the riser is pivoted rearwardly relative to the normal operating position.

3. The liquid applicator implement of claim 2, wherein the breakaway assembly includes a breakaway sensor, the breakaway sensor disposed to generate a breakaway signal upon a breakaway event, the breakaway event occurring when the riser moves from the normal operating position to the breakaway position, the breakaway sensor in communication with the controller, and wherein the controller is responsive to the generated breakaway signal to cause at least one of: (i) a warning signal to an operator that a breakaway event occurred; (ii) actuation of the boom height adjustment mechanism to raise the boom relative to the ground surface; and (iii) record an occurrence of a breakaway event.

4. The liquid applicator implement of claim 1, wherein the boom includes a center boom section, a first wing section and a second wing section, and wherein the plurality of drop assemblies are spaced along the center boom section, the first wing section and the second wing section.

5. The liquid applicator implement of claim 4, wherein at least one of the plurality of drop assemblies of the center boom section includes a center height sensor assembly according to the height sensor assembly of claim 1, wherein at least one of the plurality of drop assemblies of the first wing section includes a first wing height sensor assembly according to the height sensor assembly of claim 1, and wherein at least one of the plurality of drop assemblies of the second wing section includes a second wing height sensor assembly according to the height sensor assembly of claim 1, the rotation sensor of the center height sensor assembly generating a center height signal indicative of a distance between the base unit of the drop assembly of the center boom section and the ground surface, the rotation sensor of the first wing height sensor assembly generating a first wing height signal indicative of a distance between the base unit of the drop assembly of the first wing section and the ground surface, the rotation sensor of the second wing height sensor assembly generating a second wing height signal indicative of a distance between the base unit of the drop assembly of the second wing section and the ground surface;

wherein the controller is responsive to the generated center height signal, the generated first wing height signal and the generated second wing height signal to actuate the boom height adjustment mechanism to raise the boom relative to the ground surface upon any one of the generated center height signal, the generated first wing height signal and the generated second wing height signal indicating a distance to the ground surface below the base unit of the drop assembly of the center boom section, first wing section or second wing section is less than a predetermined distance.

6. The liquid applicator implement of claim 5, wherein the boom height adjustment mechanism includes a center height adjustment mechanism, a first wing height adjustment mechanism and a second wing adjustment mechanism;

wherein the controller is responsive to the generated center height signal to actuate the center height adjustment mechanism to raise the center boom section relative to the ground surface upon the generated center height signal indicating a distance to the ground surface below the base unit of the center boom section is less than a predetermined distance;

wherein the controller is responsive to the generated first wing height signal to actuate the first wing height adjustment mechanism to raise the first wing section relative to the ground surface upon the generated first wing height signal indicating a distance to the ground surface below the base unit of the first wing section is less than a predetermined distance;

wherein the controller is responsive to the generated second wing height signal to actuate the second wing height adjustment mechanism to raise the second wing section relative to the ground surface upon the generated second wing height signal indicating a distance to the ground surface below the base unit of the second wing section is less than a predetermined distance.

7. The liquid applicator of claim 1, wherein the at least one tube includes a first tube and a second tube supported from the base unit, wherein the outlet ends of the first and second tubes are laterally spaced with respect to the riser and are disposed rearward of the riser when the implement is traveling in the forward direction of travel.

8. The liquid applicator of claim 1, wherein the riser of each of the plurality of drop assemblies supports a spray nozzle in liquid communication with the liquid source, the spray nozzle configured to spraying the liquid product above the ground surface.

9. The liquid applicator of claim 3, wherein the controller is configured to designate a recorded breakaway event as a non-trusted breakaway event when the generated height signal indicates the distance between the base unit of the at least one drop assembly and the ground surface is greater than a predetermined distance.

* * * * *